United States Patent [19]

Huckabay et al.

[11] 4,320,098

[45] Mar. 16, 1982

[54] ALUMINUM SULFATE MANUFACTURE FROM ALUMINUM DROSS TAILINGS

[75] Inventors: Durward A. Huckabay, Reno, Nev.; Arthur D. Skiathas, El Sobrante, Calif.

[73] Assignee: Imperial West Chemical Company, Reno, Nev.

[21] Appl. No.: 221,380

[22] Filed: Dec. 30, 1980

Related U.S. Application Data

[63] Continuation of Ser. No. 24,941, Mar. 29, 1979, Pat. No. 4,252,776.

[51] Int. Cl.$^3$ .............................................. C01F 7/74
[52] U.S. Cl. .................... 423/132; 423/111; 423/128; 423/556
[58] Field of Search ............... 423/111, 114, 128, 132, 423/556

[56] References Cited

U.S. PATENT DOCUMENTS

| | | | |
|---|---|---|---|
| 1,962,498 | 6/1934 | Frost | 423/128 |
| 3,955,969 | 5/1976 | Johnson | 423/111 |
| 4,160,815 | 7/1979 | Huckabay | 423/128 |

FOREIGN PATENT DOCUMENTS 2458955  6/1975  Fed. Rep. of Germany ...... 423/556

*Primary Examiner*—Herbert T. Carter
*Attorney, Agent, or Firm*—Fischer, Tachner & Strauss

[57] ABSTRACT

There is disclosed a method for the elimination of the chief impurities in aluminum dross tailings. The method can be used as a pretreatment in the manufacture of aluminum sulfate from aluminum dross tailings in a continuous flow reaction zone in which the dross tailings prior to reaction with sulfuric acid are pretreated to reduce the more objectionable contaminants contained therein to acceptable levels. The most objectionable contaminant in the dross tailings is aluminum metal which, in the invention, is oxidized with water or steam at elevated temperatures. The dross tailings, which are chiefly particles of aluminum oxide, are suspended in an aqueous slurry and the slurry is heated to a temperature from 185°–225° F. and maintained under liquification pressures and sufficient agitation to insure particle-to-particle attrition that removes an aluminum hydroxide coating which would otherwise inhibit the reaction.

16 Claims, 5 Drawing Figures

ALUMINUM SULFATE MANUFACTURE FROM ALUMINUM DROSS TAILINGS

This application is a continuation of Ser. No. 24,914 filed Mar. 29, 1979, now U.S. Pat. No. 4,252,776.

BACKGROUND OF THE INVENTION

In the processing of molten aluminum, oxidation forms aluminum dross, chiefly aluminum oxide with varied amounts of impurities. The dross is skimmed from the molten metal and is processed in rotary furnaces with fluxes of sodium and potassium chlorides which are added to promote dross separation and eliminate gas inclusion. The processed dross is discharged as a waste which contains chiefly aluminum oxide, water soluble salts such as sodium and potassium chlorides, substantial quantities of aluminum metal and lesser quantities of impurities such as aluminum carbide and aluminum nitride.

The dross is further processed through aluminum recovery plants which mill and screen the dross and recover the coarse particles which are substantially pure aluminum. The processed aluminum dross (dross tailings) is discharged as an aqueous slurry from which the waste solids are settled and then discharged to a storage area.

The impurities in the dross tailings have, heretofore, precluded utilization of the alumina in the tailings and, consequently, the dross tailings have accumulated over the years in piles adjacent aluminum recovery plants. These piles are unsightly and present environmental problems since the water soluble salts in the tailings are leached by rain and are discharged to surface and ground waters.

Aluminum sulfate has, in recent years, been in increasing demand, principally for use as a flocculant in water clarification for industrial and sewage water treatment plants. The aluminum sulfate is currently manufactured by the reaction of sulfuric acid with valuable aluminum sources such as aluminum oxide trihydrate and/or bauxite. Although the aluminum dross tailings would appear to be a less expensive source raw material for aluminum sulfate, the contaminants present in the dross tailings effectively have prevented utilization of this waste material.

BRIEF DESCRIPTION OF THE INVENTION

This invention comprises a treatment of aluminum dross tailings to decrease the concentration of contaminants therein to acceptable levels and permit utilization of alumina in the dross tailings. This invention also comprises a continuous flow process for the production of aluminum sulfate from sulfuric acid and aluminum oxides and, in particular, from aluminum oxide dross tailings.

The aluminum dross tailings are treated in the invention by washing, to remove water soluble salts from an aqueous slurry of raw dross tailings, and reacting the dross contaminants with water at elevated temperatures. The reaction is performed in the liquid phase and under sufficient agitation to insure particle-to-particle attrition to break the protective aluminum hydroxide film which forms about the aluminum metal contaminant particles, thereby achieving substantially complete oxidation of the aluminum metal contaminant to useful aluminum oxide trihydrate. The conditions of the reaction are also sufficient to effect the decomposition of any aluminum nitride contaminant which may be present to aluminum oxide trihydrate and ammonia and/or the decomposition of any aluminum carbide contaminant which may be present to aluminum oxide trihydrate and methane.

In the preferred processing, the reaction of the contaminants with water is accelerated by additives which destroy the protective aluminum hydroxide film surrounding the aluminum metal, such as trace quantities of caustic which supplies hydroxyl ligands that complex and solubilize the aluminum hydroxide and/or the use of inert, refractory, particulate materials such as ceramic balls to mechanically assist the attrition. In a preferred embodiment, the gases evolved from the reaction are collected, dried and burned to supply energy requirements of the process. In other preferred embodiments, the reaction is performed in a continuous upflow clarification vessel to remove a slurry of fine particles of aluminum oxide from the upper portion of the vessel from the more dense and larger fractions which are selectively concentrated with the contaminants and which remain in a highly turbulent reaction zone and are subjected therein to attrition.

DESCRIPTION OF PREFERRED EMBODIMENTS

Figure 1:
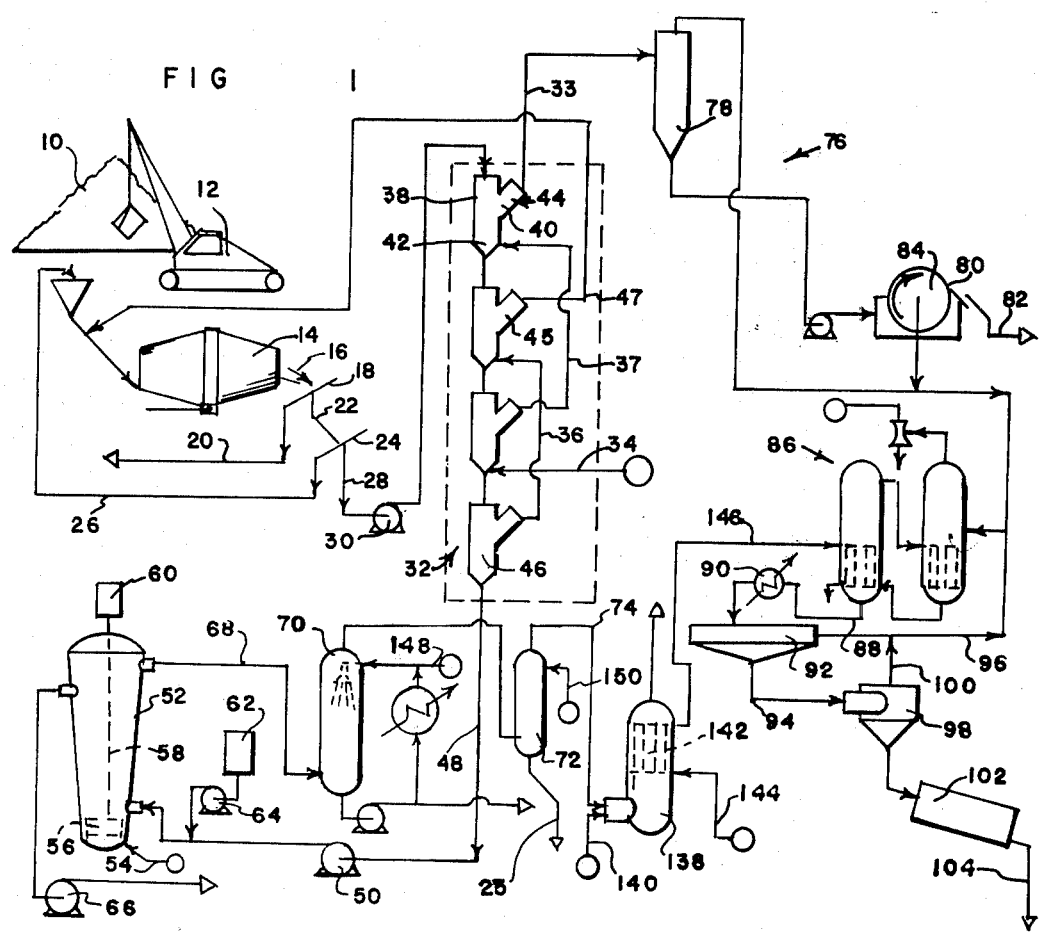
FIG. 1 is a schematic flow diagram of the pretreatment process.

Referring now to FIG. 1, the aluminum dross tailings are removed from the storage pile 10 by a clam shell or shovel 12 and are passed to a suitable size reduction step such as a jaw crusher and/or ball mill 14. In ball mill 14, the larger particles are reduced in size by tumbling against other particles and against gravel and inert solids which are present. Water, preferably recycled brine, is added to the ball mill 14 to form a slurry. The oxides are removed from ball mill 14 as a slurry of from 5 to about 20 weight percent solids through line 16 and are passed through screening operations such as trommel screen 18 which has a size of about 14 mesh where the largest size materials, comprising inerts such as rocks and gravel, are removed for disposal through line 20. The materials passing the screen are passed as a slurry through line 22 to subsequent screening in Sweco screen 24, which has a size of about 30 mesh, where the coarse oxides and some aluminum metal are removed through line 26 and are returned to ball mill 14. Since the aluminum particles are generally larger than the aluminum oxide particles, the oversize fraction removed in line 26 will be enriched in aluminum and all or a portion of the slurry in line 26 can be diverted to further screening and classification to recover the valuable aluminim metal.

The materials which are of a suitably small subdivision for processing through the subsequent stages, typically those passing a 30 mesh screen, are passed as a slurry through line 28 by slurry pump 30 to a bank of liquid-solid separators generally indicated at 32 to wash the water soluble salts from the oxide. The oxide slurry is processed through the separators in countercurrent contact with fresh wash water which is introduced to the process through line 34. Typically, the fresh wash water is introduced through line 34 to contact the solids discharged into the last of the serially connected liquid-solid separators.

Each of the liquid-solid separators is a vessel having a vertical, tubular main section 38 and a side outlet section 40 intersecting the main section at an angle of 45 to about 65 degrees and a conical bottom 42. The incoming slurry is introduced into the open, upper end of the main section 38 of the first separator 44 and the washed solids are removed through the bottom port of its conical section 42. The wash water to each succeeding separator is introduced into the outlet of the conical section 42 of the preceding separator. The wash water is removed through the side outlets 40 of each of the separators and is passed through lines 36 and 37 to be introduced as the inlet wash water for the preceding stage of the serially connected separators. In a typical process, a plurality of such separators, e.g., four to about six separators are serially interconnected to effect a substantial washing of the salts from the oxides.

The wash water is removed from the side outlet 40 of the second separator 45 and is passed through line 47 as a source of brine for the size reduction stage, such as ball mill 14. This brine has a concentration of about 5 to 10 weight percent salts, typically sodium and potassium chlorides.

A brine solution containing from 15 to about 30 weight percent salts is removed from side outlet 40 of the first separator 44 and is passed through line 33 to the salt recovery unit 76. This brine also has a suspension of finely divided solids, chiefly aluminum oxides which are recovered in the succeeding treatment.

An alternative method for washing the oxide and removing the salts comprises filtration of the slurry delivered by pump 30 and washing of the filtered solids. Suitable equipment for this is a settling clarifier or a travelling bed filter which has a continuous filter belt that passes over vacuum receivers to remove the salt brine from the oxides which are transported by the belt and reslurried in fresh water.

The slurry of the washed oxides is removed from the last separator 46 through line 48 and is passed by pump 50 to a reaction vessel 52. The slurry is heated to a suitable reaction temperature, e.g., from 185° to about 225° F. by suitable means, such as steam, introduced through line 54 and/or other heating means such as indirect heat exchange. The reactions of the contaminates which occur in vessel 52 are exothermic and the concentrations of the contaminates in the slurry will usually be sufficient to supply the necessary heat to maintain the reaction temperature. Accordingly, after start-up, heating may be unnecessary and, in instances with high concentrations of impurities, cooling may be necessary. The slurry of solids is maintained at the reaction temperature and is confined within the reaction vessel 52 under suitable pressure, typically from atmospheric to about 25 psig, preferably from 5 to about 12 psig, to maintain the liquid phase. The slurry within the reactor is agitated, preferably by a mechanically driven propeller mixer 56 that is connected to a drive shaft 58 extending to an externally mounted motor 60.

The impurities which are present in the aluminum oxides react in vessel 52 as follows:

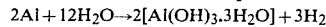
$$2Al + 12H_2O \rightarrow 2[Al(OH)_3.3H_2O] + 3H_2$$

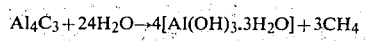
$$Al_4C_3 + 24H_2O \rightarrow 4[Al(OH)_3.3H_2O] + 3CH_4$$

$$Al_2N_2 + 12H_2O \rightarrow 2[Al(OH)_3.3H_2O] + 2NH_3$$

The chief impurity that is present in the aluminum oxides is metallic aluminum, which can comprise from 0.1 to about 25, usually from 1 to about 5 weight percent (dry basis) of the solids present. The reaction of the metallic aluminum with water, however, is inhibited by the formation of a protective layer of aluminum hydroxide which envelopes the aluminum metal particles. The invention achieves a continuous and accelerated rate of reaction of the aluminum metal with the water by agitation of the slurry with the mechanically driven propeller 56, which achieves particle-to-particle attrition that breaks the protective oxide film and insures the continuance of the reaction.

The reaction can be further accelerated by additives to the reactor 52. Suitable additives include mechanical attrition aids such as refractory particulate matter, e.g., ceramic balls, that are of sufficient density to resist floatation and removal with the slurry from vessel 52. The ceramic balls thus remain in the lower portion of reactor 52 and in contact with the denser and larger solids which also concentrate in the lower portion of the reactor, achieving a high attrition on this size fraction of solids. A suitable, commercially available source for this additive comprises spheres of aluminum oxide that are available in diameters from ⅛ to about 2 inches. Such materials are particularly suited for use in the invention since attrition or abrasion of these particles will not introduce any foreign material into the aluminum oxide suspension.

An example of a chemical additive for vessel 52 is an alkali metal hydroxide such as sodium, potassium, or lithium hydroxide. Preferably, sodium hydroxide is employed. The hydroxide is employed at a low to trace concentrations, typically from 0.01 to about 1.0 preferably from about 0.07 to about 0.15 percent, of the total weight. The alkali metal hydroxide is added, as needed, as an aqueous solution from tank 62 and metering pump 64. The hydroxide does not function as a reactant in the process and accordingly, low concentrations of the hydroxide can be used. Instead, the hydroxide functions primarily as a source of hydroxyl ligands which complex the aluminum hydroxide and remove the protective aluminum hydroxide film about the metallic aluminum particles, thus accelerating the oxidation.

Preferably, the slurry is maintained within vessel 52 in an upflow condition by introducing the slurry into the vessel through a bottom inlet port and withdrawing a slurry of processed oxide through a top port. The reactor 52 thus serves as a clarifier to effect a density and/or size separation with the higher density and coarser fraction recycling internally within vessel 52 and the lower density and finer subdivided oxides being removed as the process slurry through the top port. The latter are passed as a slurry to transfer pump 66 which can deliver the slurry as the reactant feed to the aluminum sulfate continuous flow process of the invention.

The gas which is evolved by the reactions which occur within vessel 52 is withdrawn through line 68. The gas can be passed to a suitable wet scrubber 70 where it is contacted with a spray of water or dilute sulfuric acid from line 148 to cool and condense water and remove ammonia. When the gas is cooled to about 100° F. or less, it can be used directly as fuel. Otherwise, it is desirable to pass the gas to a drying tower 72 where it contacts concentrated sulfuric acid from line 150 to reduce its moisture content. The sulfuric acid in line 25 from drying tower 72 can be used as reactant in the aluminum sulfate process. The dried gas can then be passed through line 74 as a source of fuel for boiler 138 where it is burned by air from line 140 to generate steam in tubes 142 from boiler feed water introduced through line 144. The steam is used for the process, particularly for use in the salt recovery unit 76.

The salt unit 76 comprises a plurality of treatment stages to concentrate the brine removed from the solid liquid separators through line 33 sufficiently to crystallize the salts. Residual alumina fines can be removed by passing the slurry through a settling vessel 78 to separate a clarified brine from a fines concentrate.

The fines concentrate from vessel 78 is passed to a suitable filter such as a felt filter, or a rotary filter 80. The alumina fines having a size range passing a 200 mesh screen are separated as a filter cake on the drum 84 of the filter and removed by a doctor blade and separated through line 82. The alumina oxide is a relatively pure product which can be passed by line 82 from filter 80 to the alum process or can be marketed as an alumina product. The filtered brine is removed interiorly of drum 84 and is passed to suitable concentration treatment such as solar evaporation ponds or vacuum evaporation. Preferably, the concentration is effected by a multiple effect evaporator 86. The steam generated in boiler 138 can be passed by line 146 to supply the steam required by the evaporator 86.

The concentrated salt liquor is removed from evaporator 86 through line 88, passed through a cooler 90 and to a vessel 92, where salt crystals are formed and removed through line 94. The salt liquor is recycled to the evaporator 86 through line 96. The salt crystals are passed to centrifuge 98 to remove residual brine which is recycled by line 100 and the salt crystals are dried by contact with heated dry air. This contacting can be effected in equipment such as a travelling bed conveyor, fluidized bed, or auger drier. Preferably, the crystals are dried in rotating drum 102 and removed through line 104.

Figure 2:
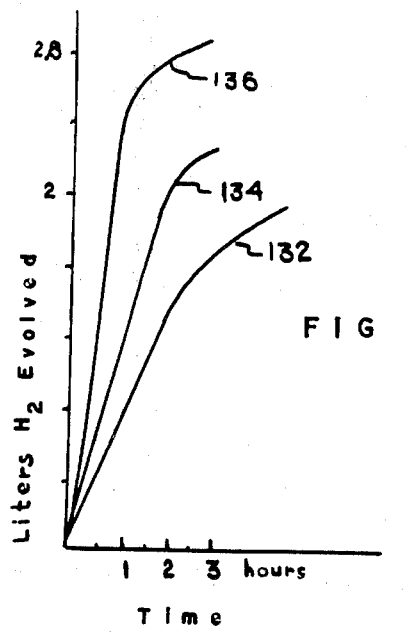
FIG. 2 is a graphical illustration of the rate of reaction of typical contaminants at varied conditions.

Referring now to FIG. 2, there is graphically depicted the reaction rate of the aluminum metal particles in a typical dross oxide raw material. The rate of reaction is depicted as the amount of hydrogen evolved as a gas from the reaction against the time of the measurement for the reaction at varied temperatures of 185° F. and 210° F., respectively, curves 134, and 136, which were plotted for reaction conditions otherwise described in the preceding example. In all instances, the slurry contained 0.5 weight percent sodium hydroxide. Also depicted in FIG. 2 is curve 132 which illustrates the hydrogen evolution at 210° F., without the use of sodium hydroxide.

Figure 3:
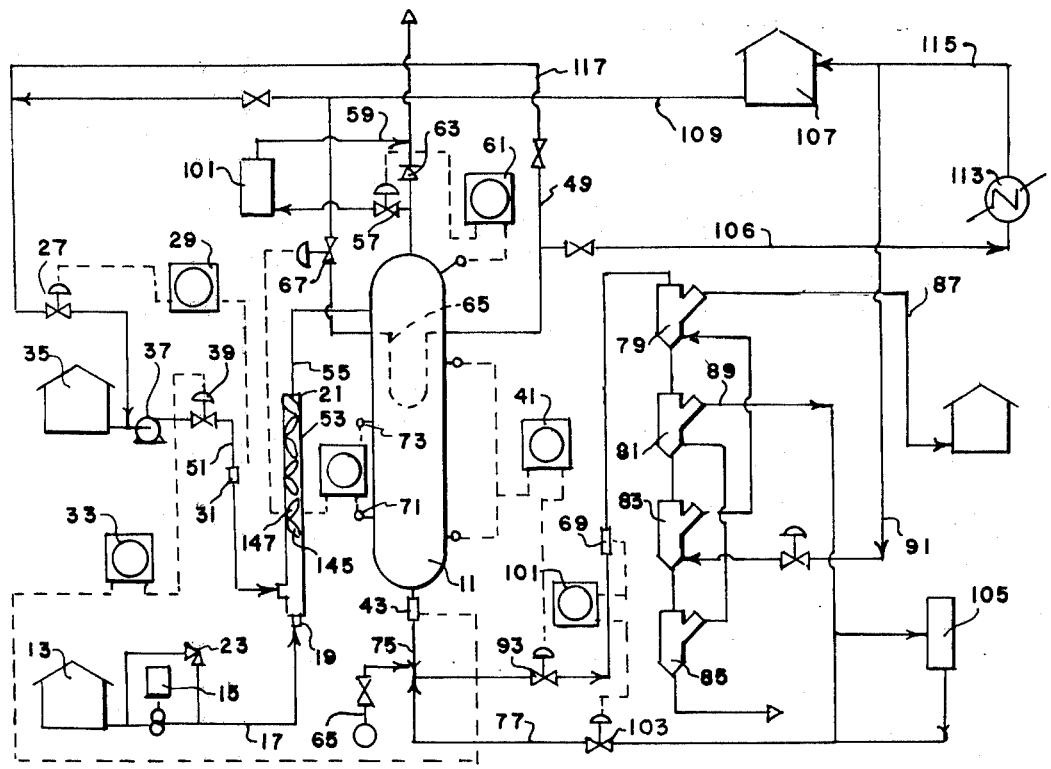
FIG. 3 is a schematic flow diagram of a suitable continuous flow aluminum sulfate process.

Referring now to FIG. 3, there is illustrated flow schematic of the preferred embodiment of the aluminum sulfate process. The reaction is conducted in reaction vessel 11 which is supplied with thoroughly blended and admixed reactants from tubular mixer 21.

The sulfuric acid for the process is stored in vessel 13 and is withdrawn through a positive displacement metering pump 15 at a predetermined, constant flow rate. The acid passed through line 17 to the central tube 19 of tubular mixer 21. In the event of a flow blockage in line 17, a relief valve 23 is provided to bypass acid about pump 15.

The aqueous slurry of pretreated aluminum dross tailings is withdrawn from storage vessel 35 by pump 37 at a flow rate controlled by valve 39. Alternatively, pump 37 can be a positive displacement pump and the flow controlled by control of the speed of the pump. The aqueous suspension of alumina is discharged through line 51 into the outer tube of the tubular mixer 21 to provide an annular, coaxial flowing stream of slurry about the acid inlet tube 19. The blended streams of acid and alumina-containing slurry are passed into the mixing portion 53 of tubular mixer 21 where the reactants are intimately admixed and wherein the exothermic heat of solution of the sulfuric acid is sufficient, with the preheat of the reactant streams, to raise the reactants to an incipient reaction temperature.

The reactants are discharged through riser 55 into the upper portion of vessel 11 which is maintained partially filled with the reactants and which has a sufficient capacity to provide the desired residence time for substantially complete reaction. The reactants are maintained at super-atmospheric pressure in vessel 11 by control valve 57 in vent line 59 which is controlled by pressure indicator controller 61 that is responsive to the measured pressure within the vessel 11. This valve can also be opened periodically to purge the system of non-condensible gases such as hydrogen. The purged gas can be passed to a vessel 119 packed with inert solids, to trap any foam before venting to the atmosphere. A relief valve 63 is provided and is set for relief of the pressure at the predetermined maximum design pressure of the reactor. The reaction pressure for a continuous process is preferably the autogenic pressure of the reactants. It is possible, however, to perform the reaction at greater pressure by delivering the reactants to autoclaves at super-atmospheric pressure or by injecting steam into the reaction zone.

The reactants introduced into reactor 11 are maintained at the optimum reaction temperature which is maintained in the vessel by cooling of the reactants with tubular heat exchanger 65. Direct cooling by injecting a cold water spray into vessel 11 can also be practiced, however, indirect cooling is preferred, to avoid dilution of the reactants in vessel 11. Cooling water is passed into the heat exchanger 65 at a rate controlled by valve 67 that is under control of temperatures at a number of locations such as thermocouples 71 and 73. The heat exchanger 65 in vessel 11 is preferably a bundle of Teflon tubes available from E.I. DuPont de Nemours Company in preassembled units having a plurality of small diameter Teflon tubes, typically, of a diameter of about 0.05 to about 0.2 inch O.D. This preassembled bundle is suspended in the reactor, and can be in the liquid or vapor phase, or both, of the vessel. It is preferred to have the bundle in the vapor phase to insure adequate cooling of the vapor phase and more precise control of the reactor pressure than achieved when the bundle is in the liquid phase.

The crude reaction product is withdrawn from vessel 11 through line 75 at a flow controlled by valve 93 and level controller 41. The product is diluted with water and recycled aluminum sulfate solution through line 77 at a rate sufficient to prevent solidification of the product and to maintain the optimum viscosity for succeeding product washing.

The diluted product is passed to a plurality of solid-liquid separators 79, 81, 83 and 85 which are similar in construction and operation to the separators 32, previously described. The aluminum sulfate solution is removed as the product liquid stream through line 87 from the first separator. Solids from separator 79 are admixed with wash water from separator 83 and passed to separator 81. A dilute aluminum sulfate solution is removed through line 89 from separator 81 and passed to a surge tank 105. A portion of the solution is passed through control valve 103 and line 77 to dilute the reactor product at a rate controlled by controller 101 that is responsive to the density of the product as detected by densitometer 69. The balance of the dilute product can be recovered as a solution of 15–22% alum. Fresh water is added through line 91 in sufficient quantities to obtain the final product concentration in line 87. Fresh water can also be added through line 65 to the product in line 75 to dilute the product sufficiently to avoid its solidification.

The rate of addition of the alumina to the process is controlled by the pump 37 and control valve 39. Alternatively, a variable speed positive displacement pump could be used to control the rate of alumina addition. This is controlled by meter 33 which responds to conductivity sensor 41 which measures the sensed electrical conductivity of the reaction product. The conductivity sensor, generally indicated at 43, is located in line 77 near the exit of vessel 11 to sense the conductivity of the crude reaction product. It could be located at an intermediate elevation within the reaction vessel 11. The conductivity meter that is used in the preferred embodiment is available from the Beckman Instrument Company, Fullerton, Calif., and is a magnetic inductance conductivity meter which has a sensing element having no electrode exposed to the corrosive reactants.

The water for the process is supplied from tank 107 to the fresh water header 109. Water from the heat exchangers is returned through recirculation line 106 to a suitable water cooler 113 that can be a heat exchanger, cooling tower or any conventional means for cooling of the return water.

The water is returned to tank 107 through line 115. If desired, the heat of reaction from the process can be used to preheat the reactants by passing a portion of the water from heat exchanger 65 to the slurry withdrawn from storage tank 35. This can be effected through bypass line 117 and associated valving. The density of the slurry is controlled with a density sensor 31 such as a nuclear densitometer, controller 29 and control valve 27, which regulates the addition of hot water from line 117 or cold water from line 109.

Figure 5:
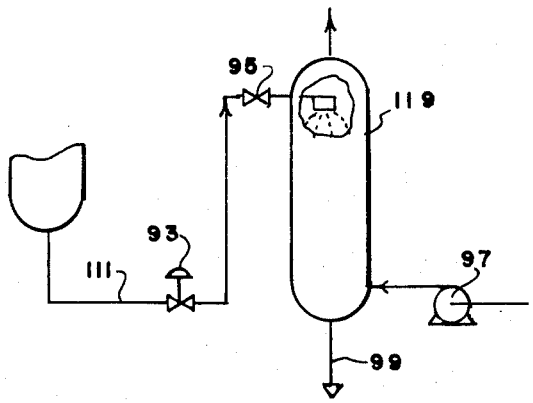
FIG. 5 illustrates a modification of the process diagram of FIG. 3.

Referring now to FIG. 5, there is shown a modification for the production of solid aluminum sulfate. In this modification, the solution withdrawn from the reactor 11 is passed by line 111 to vessel 119 at a rate controlled by valve 93 which functions as a shut-off valve. The product withdrawn from reactor 11 is molten alum which can be flashed to solid alum product. Preferably, this is accomplished in vessel 119 where the alum is discharged as a spray by a pressure reduction valve 95. Alternatively, a droplet forming nozzle and a spinner such as are conventionally used in urea prilling towers could be mounted in vessel 119. The droplets of alum fall countercurrent to a dry air stream supplied by blower 97 and solidify in vessel 119 from which they can be removed as alum prills by line 99.

Figure 4:
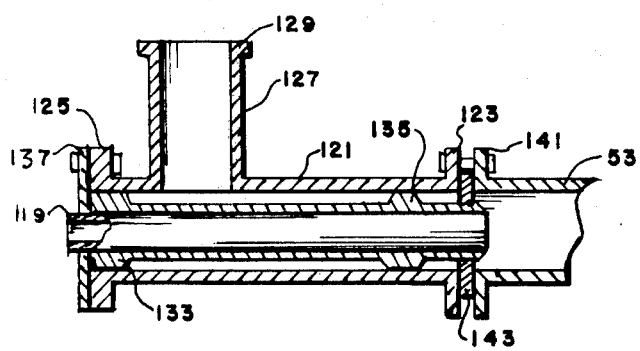
FIG. 4 is an elevational view of a suitable mixing device for use in the aluminum sulfate process.

Referring now to FIG. 4, there is illustrated a generally tubular mixer employed in the process. As illustrated, the mixer has a reactant introduction section 121 bearing end flanges 123 and 125 and a side nozzle 127 also bearing an end flange 129. The introduction section 121 is of fiberglass construction and bears a coaxial internal sleeve 19 having a base 133 for support on the interior wall of section 121 and a plurality of axial ribs 135 at its opposite end also for support of the tube 19. Flange 125 bears a closure plate 137 having a central bore through which tube 19 extends. The acid supply line 17 is attached to tube 19 to provide introduction of the sulfuric acid into the interior of the introduction section 121. The side outlet 127 is attached to the line 51 for the supply of the aqueous slurry of the alumina-containing solid which is passed as an annular stream about the sleeve 19. The blended streams are passed into the inlet of the tubular mixing section 53 that is secured to the end flange 123 of section 121 by a retainer ring 141 and sealed thereto by gasket or washer 143.

The tubular mixing section 53 is of a design and construction disclosed in U.S. Pat. No. 3,286,992 and contains a plurality of curved sheet elements such as 145 and 147 (FIG. 3) which are axially positioned along the length of the mixing section 53. The curved elements are formed of thin, flat sheet material having a width approximately equal to the diameter of the tube and a length from 1.25 to 1.5 times its width and twisted so that the upstream and downstream edges of each element are at a substantial angle to each other, e.g., at an included angle of from 60° to about 210° F. As apparent from FIG. 3, the adjacent elements are twisted in opposite directions, e.g., element 145 having a left hand spiral and element 147 having a right hand spiral in the direction of flow. In the transit through the mixing section, the blended reactants from the introduction section 121 are caused to undergo a helical flow by curved elements such as 145. The direction of rotation of this helical flow is repeatedly reversed by the curved elements of opposite rotation such as 147 so that the reactants are intimately admixed within a very short travel of mixing section 53.

The sulfuric acid that can be used for the reaction can be from about 30 to 99.4 weight percent sulfuric acid or fuming sulfuric acid (oleum) containing up to about 80 weight percent free sulfur trioxide. Generally, the acid will be diluted to approximately 30 to 60 weight percent in the reactor and, accordingly, acid of 30 weight percent or greater can be employed in the reaction. The concentration of the sulfuric acid supplied to the reaction depends on the process technique. If the alumina-containing solid is added as a solid to the reactor, all or any portion of the necessary water can be added with the sulfuric acid, e.g., sulfuric acid of a concentration as low as about 30 weight percent can be used. It is preferred, however, to employ concentrated sulfuric acid and use the heat of dilution of the acid as preheat for the reactants. Accordingly, sulfuric acid of a strength above about 60 weight percent is preferred. Concentrations of 70 to about 98 are preferred and of 90 to about 99.4 weight percent are most preferred.

The reactants are heated sufficiently that upon admixture with the reacting mixture of alumina and sulfuric acid in the reaction zone they are heated to reacting temperature. Preferably, the reactants are preheated to an incipient reaction temperature of about 150° F., most preferably about 190° F., in the mixing zone and are introduced at that temperature to the reactor. If desired, greater heating of the reactants can be achieved in the mixing zone and the reaction can be initiated in the mixing zone to achieve a higher capacity or throughput of the plant.

The reactants can be maintained at a temperature of from 225° F. to about 260° F., however, a slightly higher temperature range from 225° to about 350° F. and, most preferably, about 285° to about 300° F. can be used in the reaction zone to obtain a high reaction rate. As previously indicated, this temperature is maintained by control of the flow rate of cooling water through the heat exchanger of the reaction zone. The pressure on the reactants in the reaction zone is the autogenic pressure of the reactants from 20 to about 35 psig, preferably from 20 to about 120 psig and, most preferably, from 39 to about 54 psig, corresponding to the aforementioned temperatures. The residence time of the reactants in the reaction zone is maintained from 5 to about 45 minutes, preferably, from 5 to about 25 minutes and, most preferably, from 7 to about 20 minutes, and sufficient to achieve from 78 to about 100, preferably, from 90 to about 100 percent completion of the reaction. The product removed from the reactor is diluted to provide a final product having a density from about 1.2 to about 1.4, preferably, about 1.25 to about 1.35 specific gravity.

The aluminum dross treatment will now be described with reference to the following examples which will serve to illustrate a mode of practice and demonstrate results obtainable thereby.

EXAMPLE 1

Comparative laboratory experiments were performed on samples of aluminum dross tailings having the following sieve analysis:

TABLE 1

| Screen Mesh Size | Weight Percent | Aluminum Metal Concentration (%) |
|---|---|---|
| +10 | 4.7 | 100 |
| +20 | 22.4 | — |
| +40 | 23.9 | — |
| +80 | 20.0 | — |
| +200 | 15.9 | — |
| −200 | 13.3 | — |
| −10 | 95.3 | 27.9 |

The aluminum dross tailings contained 20 weight percent sodium and potassium chlorides. The dross tailings were washed twice with fresh water, dried and processed in a laboratory vessel having a magnetic bar stirrer. In two successive experiments, 100 grams of dried dross-tailings passing a 10 mesh screen were added to 186 grams water and 100 milliliters of glass beads of ⅛ inch diameter in the laboratory vessel. The mixture was heated to and maintained at 195°–210° F. for two hours while stirring at 80 rpm. In the second experiment, 0.5 weight percent sodium hydroxide was also added to the vessel contents.

After the reaction period of two hours, the vessel contents were removed, drained and dried and Table 4 summarizes the results.

TABLE 2

| Experiment Number | 1 | 2 |
|---|---|---|
| Aluminum Metal Sieve Analysis | 1.7 | 0.2 |
| +20 | 4.1 | 0.2 |
| +40 | 3.9 | 3.0 |
| +80 | 3.8 | 1.9 |
| +200 | 0.9 | 3.3 |
| −200 | 87.4 | 91.6 |
| Weight Dried Product | 145.9 | 149.0 |

TABLE 2-continued

| Experiment Number | 1 | 2 |
|---|---|---|
| Percent Conversion of Al° | 90.7 | 99.2 |

EXAMPLE 2

A laboratory investigation on the reactivity of the aluminum metal in a typical aluminum oxide dross tailings sample was studied in a stirred reactor. The reactor was a metal vessel 14 inches high and 8 inches in diameter. The vessel had an arcuate bottom and a propeller mixer was fabricated having a contour which conformed to the internal shape of the vessel bottom. The propeller was suspended in the vessel with a clearance of ⅜ inch between its edges and the bottom wall of the reactor vessel. The vessel was charged in the experiments with three liters of water, one liter of the dry aluminum oxide dross tailings (1300 grams) and one liter of aluminum oxide beads (2093 grams) having a uniform diameter of ¼ inch. The mixture was stirred at a constant 70 rpm speed. The slurry within the vessel was heated to a temperature of 196°–212° F. by direct injection of steam. The temperature was self sustaining by the reaction exotherm during the first 60 minutes when water was added to replace that lost by evaporation. The reaction rate decreased during the last 60 minutes and the temperature was maintained during that period by resuming steam injection. The dross tailings charged to the reactor were washed to reduce their salt content to less than 0.5 weight percent. The washed tailings were screened through a 14 mesh screen and the −14 mesh fraction, which was used in experiment, contained 28 weight percent metallic aluminum and had the following particle size distribution:

TABLE 3

| Screen Mesh Size | Weight Percent |
|---|---|
| +20 | 2.5 |
| +40 | 13.5 |
| +80 | 62.1 |
| +200 | 20.4 |
| −200 | 1.5 |

After two hours, the reactor contents were discharged and dried and analyzed to determine that the metallic aluminum content was 3.4 weight percent. The particle size analysis of the product is set forth in the following table:

TABLE 4

| Screen Mesh Size | Weight Percent |
|---|---|
| +20 | 0 |
| +40 | 2.8 |
| +80 | 18.1 |
| +200 | 28.5 |
| −200 | 50.6 |

EXAMPLE 3

An aluminum dross treatment process such as illustrated in FIG. 1 is operated for the production of 4628 weight parts of aluminum oxide trihydrate per hour. The feed material which is introduced into the size reduction step such as ball mill 14 comprises 4500 parts alumina trihydrate, 5000 parts of a mixed potassium and sodium chloride salts and 500 weight parts aluminum. The preliminary screenings result in separation of an enriched aluminum stream through line 26 containing 300 weight parts aluminum per hour and 11 weight parts of potassium and sodium chloride in 33 weight parts of water. The screen product which is passed by pump 30 to the solid-liquid separators comprises 200 weight parts aluminum, 4500 weight parts alumina trihydrate, 5,951 weight parts of mixed chloride salts and 17,853 weight parts water. An equal amount of water in the quantity of 17,886 parts per hour is added as wash water through line 34, producing an oxide stream which is removed from the last liquid separator through line 42 containing 200 weight parts aluminum, 4050 weight parts alumina trihydrate, 30 weight parts mixed salts and 2976 weight parts water. The recycle brine passed through line 47 to the milling operation comprises 962 weight parts mixed salts and 17,886 weight parts of water. The brine removed through line 33 from the first separation stage contains 450 weight parts alumina trihydrate as fines passing a 200 mesh screen, 4959 weight parts mixed salts and 14,877 parts of water. Fresh water in an amount of 3349 parts per hour is added to the washed alumina slurry passed through line 42 to the reactor 52. Caustic solution comprising 44 parts water and 44 parts sodium hydroxide per hour is introduced by pump 64 to blend with this stream passed to reactor 52.

The reacted product removed from reactor 52 and passed by pump 66 to further reaction in the aluminum sulfate plant comprises a slurry of 4628 parts alumina, 30 parts mixed sodium and potassium chlorides and 44 parts sodium hydroxide in 5,991 parts water.

The concentrated brine is separated in thickner 78 to obtain a clarified brine containing 4,678 parts of mixed sodium and potassium chlorides in 14,034 parts per hour of water which is passed to the multiple effect evaporator 86. The stream removed from the bottom of thickener 78 and passed to the rotary filter 80, comprises 450 parts alumina hydrate, 381 parts of mixed sodium and potassium chlorides in 844 parts per hour of water. This material is filtered to recover the alumina fines as a slurry of 450 weight parts alumina hydrate, 15 weight parts of mixed salts in 300 parts water through line 82. The filtrate separated in filter 80 containing 4944 weight parts of sodium and potassium chlorides in 15,578 weight parts per hour of water, is also passed to the multiple effect evaporator where it is concentrated to obtain a concentrated solution. The salts in the stream are recovered as dried product through line 104.

EXAMPLE 4

A continuous process such as illustrated in FIG. 3 is operated for the production of about 33,000 weight parts of product per hour. The slurry is pretreated aluminum oxide dross tailings is supplied to the reactant mixing zone at a rate of about 31 gallons per minute where it is blended with sulfuric acid of about 98 weight percent concentration that is supplied thereto at the rate of about 9 gallons per minute. The admixed reactants during steady state operation of the process have a temperature, resulting from the exothermic heat of solution of the sulfuric acid upon mixing, of about 190° F. At the start up of the process, steam is introduced into the slurry mixing tank to raise the temperature of the slurry to about 135° F. which is sufficient, with the heat of solution of the sulfuric acid, to heat the reactants upon mixing to a temperature of about 225° F. and thereby initiate the reaction.

The reactants are passed to the reaction zone that is maintained at a temperature of 285°–300° F. by circulation of water through its internal heat exchanger. The reactor pressure is maintained at 39–54 psig and the product is withdrawn from the process at a rate sufficient to maintain a 10 minute residence time within the reactor. The crude reaction product withdrawn from the reactor is diluted with water and dilute aluminum sulfate solution to produce a final product having a density of 1.33, corresponding to about 11 pounds aluminum sulfate solution per gallon.

The equipment used in the process is constructed of suitable corrosion resistant material for handling of the highly corrosive sulfuric acid reactants and the product of the reaction. The tubular mixer of FIG. 4 can be constructed of Pyrex or fiberglass reinforced resins and the reactor vessel can be constructed of fiberglass reinforced resins with a Teflon heat exchanger bundle. The mixing section of the tubular mixer can be constructed of glass or, more preferably, is also constructed of fiberglass reinforced resin for greater structural strength.

The invention has been described with reference to the presently preferred and illustrated embodiment. It is not intended that the invention be unduly limited by this description of preferred embodiments. Instead, it is intended that the invention be defined by the reagents, method steps, and their obvious equivalents, set forth in the following claims.

What is claimed is:

1. A method for the manufacture of aluminum sulfate from the reactants comprising sulfuric acid and aluminum dross tailings comprising a mixture of water soluble salts, aluminum oxides and aluminum metal particles which comprises treatment of aluminum dross tailings by:
   (a) washing said aluminum dross tailings with water to remove water soluble salts and form an aqueous slurry of aluminum oxides and aluminum metal particles containing no more than about 1 weight percent soluble salts;
   (b) heating said slurry to a temperature from 185 to about 225 degrees F. and agitating said slurry to cause sufficient particle-to-particle attrition to remove the aluminum hydroxide protective film on the aluminum metal particles to reduce the metallic aluminum content of said slurry to less than about 0.5 weight percent and thereby produce treated dross tailings, and thereafter reacting the treated dross tailings with sulfuric acid having a concentration from 30 to 99.4 weight percent at a temperature from 225 degrees to 360 degrees F. and at sufficient pressure at said temperature to maintain said reactants in liquid phase, for a time from 5 to 45 minutes, and recovering aluminum sulfate from the resulting reaction product.

2. The method of claim 1 wherein said reaction with sulfuric acid is performed in a continuous flow reaction zone at a pressure from 20 to about 135 psia.

3. The method of claim 1 wherein said treated dross tailings are passed into a pressured reaction zone as an aqueous slurry stream and said sulfuric acid is injected into the center of said slurry stream to flow concurrently therewith and mix into said aqueous slurry stream.

4. The method of claim 3 wherein said sulfuric acid and said aqueous slurry stream are mixed by passing said streams, after injection of said acid, concurrently through a tubular flow zone, by diverting their flow into a helical path and repeatedly reversing the direction of rotation of said helical flow through said tubular flow zone.

5. The method of claim 1 wherein water vapor and non-condensible gases including hydrogen are evolved during heating and agitating of said slurry of dross tailings and said method includes the steps of collecting the evolved gases, cooling of said gases to condense water vapor therein, and burning said non-condensible gases to generate useful steam for said process.

6. The method of claim 1 wherein said water soluble salts are removed as an aqueous salt solution and including the steps of evaporating said salt solution to dryness recovering the salts therefrom.

7. The method of claim 1 wherein water vapor and incondensible gases including hydrogen are evolved during heating and agitating of said slurry of dross tailings and collecting the evolved gases, cooling of said gases to condense water vapor therein, and
   wherein said water soluble salts are removed as an aqueous salt solution and including the steps of evaporating said salt solution to dryness recovering the salts therefrom and burning said non-condensible gases to generate steam for evaporating said salt solution.

8. The method of claim 1 wherein said heating and agitating of said slurry is performed in an upflow process vessel by introducing said slurry into the bottom of said vessel, stirring said slurry therein, and withdrawing a slurry of treated dross tailings from the upper end of said vessel at a rate sufficient to permit clarification of coarse and high density solids in said upflow vessel from the slurry withdrawn from said vessel.

9. A process for the manufacture of aluminum sulfate by the reaction of sulfuric acid and aluminum dross tailings comprising a mixture of water soluble salts, aluminum oxides and aluminum metal particles comprising:
   (a) washing said aluminum dross tailings with water to remove water soluble salts and form an aqueous slurry of aluminum oxides and aluminum metal particles containing no more than about 1 weight percent soluble salts;
   (b) heating said slurry to a temperature from 185 to about 225 degrees F. and agitating said slurry to cause sufficient particle-to-particle attrition to remove the aluminum hydroxide protective film on the aluminum metal particles to reduce the metallic aluminum content of said slurry to less than about 0.5 weight percent and thereby produce treated dross tailings,
   (c) injecting into said slurry aqueous sulfuric acid of a concentration sufficient to provide a sulfuric acid concentration of from 30 to about 60 weight percent in the resultant blend;
   (d) passing said blend through a continuous, tubular flow zone, diverting the blend therein into helical flow within said zone and repeatedly reversing the direction of rotation of said helical flow through said zone;
   (e) discharging said blend under pressure into a continuous flow reaction zone; and
   (f) withdrawing a crude reaction product from said reaction zone and separating unreacted solids therefrom to produce said aluminum sulfate.

10. The method of claim 9 wherein said sulfuric acid is injected into the center of a flowing stream of said slurry.

11. The method of claim 10 wherein said sulfuric acid reactant is supplied at a concentration from 90 to about 98 weight percent.

12. The method of claim 10 wherein said sulfuric acid reactant is supplied at a concentration from 70 to about 98 weight percent.

13. The method of claim 12 wherein said sulfuric acid is introduced at a constant rate of flow.

14. The method of claim 13 wherein said slurry is supplied at a constant rate, proportional to the rate of flow of said sulfuric acid.

15. The method of claim 13 wherein the specific conductivity of the reacting mixture is determined and the proportions of sulfuric acid and aluminum oxide in said reaction mixture are controlled in response thereto to maintain a predetermined concentration of reactants and reaction product in said reaction zone.

16. The method of claim 9 wherein said slurry is supplied having a concentration of at least 35 weight percent alumina.

* * * * *